United States Patent [19]
Sumiya et al.

[11] Patent Number: 6,130,304
[45] Date of Patent: Oct. 10, 2000

[54] WATER-ABSORBENT OR WATER-RETENTION MATERIAL AND PRODUCTION METHOD THEREOF

[75] Inventors: Takashi Sumiya, Shiga-ken; Masami Koike, Osaka-fu; Yoji Fujiura; Mihoko Nomoto, both of Kyoto-fu, all of Japan

[73] Assignee: Sanyo Chemical Industries, Ltd., Kyoto-Fu, Japan

[21] Appl. No.: 08/855,226

[22] Filed: May 13, 1997

[30] Foreign Application Priority Data

May 14, 1996 [JP] Japan .................................. 8-144981
May 14, 1996 [JP] Japan .................................. 8-144982

[51] Int. Cl.$^7$ ........................ C08F 120/06; C08F 120/10; C08F 118/02
[52] U.S. Cl. ...................... 526/317.1; 526/318; 526/319; 526/320; 526/321; 526/328.5
[58] Field of Search ................................ 526/317.1, 318, 526/319, 320, 321, 328.5

[56] References Cited

U.S. PATENT DOCUMENTS 3,985,697   10/1976   Urbach .

FOREIGN PATENT DOCUMENTS

| | | |
|---|---|---|
| 53-104691 | 9/1978 | Japan . |
| 56-161412 | 12/1981 | Japan . |
| 61-036309 | 2/1986 | Japan . |
| 4-045850 | 2/1992 | Japan . |
| 1 534 607 | 12/1978 | United Kingdom . |

*Primary Examiner*—Nathan M. Nutter
*Attorney, Agent, or Firm*—Merchant & Gould P.C.

[57] ABSTRACT

The present invention can provide a water-absorbent or water-retention material comprising water-absorbent resin derived from monomer unit components comprising 40 to 99 wt. % of hydroxyl alkyl (meth)acrylate, 1 to 60 wt. % of (meth)acrylic acid and/or alkali metal salt thereof and 0.00001 to 3 wt. % of crosslinking agent; and a water-absorbent or water-retention material comprising water-swellable polymer which is obtained by further thermally crosslinking a particles of partially alkaline neutralized product of a copolymer of 20 to 99 mol % of acrylamide and 1 to 80 mol % of acrylic acid. The water-absorbent or water-retention material of the present invention is not readily subject to an influence of salts, and the absorbency does not deteriorate with respect to an aqueous solution containing a great amount of metallic ion of salts.

19 Claims, No Drawings

WATER-ABSORBENT OR WATER-RETENTION MATERIAL AND PRODUCTION METHOD THEREOF

BACKGROUND OF THE INVENTION

1. Field of the Invention

The present invention relates to a water-absorbent and water-retention material comprising a water-absorbent resin which is excellent in stability and has salt resistance and relates to the method for producing the same. More particularly, the present invention relates to a water-absorbent or water-retention material comprising a water-absorbent resin derived from unit components comprising hydroxyl group-containing water soluble mono-(meth) acrylate, (meth)acrylic acid and/or alkali metal salt thereof and crosslinking agent at a predetermined ratio as essential components. The present invention also relates to a water-absorbent or water-retention material comprising a thermally-crosslinked product of a copolymer of (meth) acrylamide and (meth)acrylic acid (alkali metal salt). Herein, the term "(meth)acryl—" denotes "acryl—" and/or "methacryl—". Moreover, at least one kind of monomer selected from the group consisting of acrylic acid, methacrylic acid, alkali metal salt of acrylic acid, and alkali metal salt of methacrylic acid will be generally named as "(meth) acrylic acid (alkali metal salt)."

2. Description of the Prior Art

Hitherto, water-absorbent resins have been widely used in hygienic materials such as sanitary materials and paper diapers, water retainers for soil and the like. Water insoluble crosslinked polymers are known as such water-absorbent resins. Examples of the above mentioned water-absorbent resins include crosslinked polyacrylic acid salts, self-crosslinking type polyacrylic acid salts, and crosslinked copolymer of starch-grafted acrylic acid salts.

Such acrylic water-absorbent resins are highly absorbent for solutions having relatively low concentration of ions, for example water or urine, but the absorbency is much less for an aqueous liquid containing a high concentration of metal ion, for example sea water or a cement slurry that contains a large amount of calcium ion. Moreover, in a case where an acrylic water-absorbent resin is used in the form of a hydrogel, under a condition in which free radicals are generated in a molecule, for example, by exposure to the light or by being left at a high temperature for a long time, a cleavage in the main chain of the polymer occurs due to the radicals. As a result, the gel elasticity deteriorates significantly. Furthermore, the acrylic resins cannot retain the form of a gel.

As a water-absorbent resin which increases the absorbency of an aqueous liquid containing metal ions, for example, sea water, cement slurry or the like, the following ① to ③ have been suggested.

① A crosslinked polymer of sulfonic acid monomer (salt) or a crosslinked copolymer of sulfonic acid monomer (salt) with acrylic acid (salt) (disclosed for example in Japanese Laid Open Patent Application Tokkai Sho No. 56-161412, Tokkai Sho No. 61-36309 and others). Herein, "sulfonic acid monomer (salt)" denotes sulfonic acid monomer and/or sulfonic acid salt monomer; and "acrylic acid (salt)" denotes acrylic acid and/or acrylic acid salt. Similar expressions are used hereinafter.

② A crosslinked copolymer of acrylic acid salt and poly (vinyl alcohol) (PVA) (disclosed in Japanese Laid Open Patent Application Tokkai Sho No. 53-104691.)

③ A crosslinked copolymer of acrylamide and acrylic acid (salt) (disclosed in Japanese Laid Open Patent Application Tokkai Hei No. 4-45850.)

However, in ① above, the dissociation degree of sulfonic acid is higher than that of carboxylic acid. Therefore, the polymer of ① above has relatively high absorbency of an aqueous liquid containing a salt of monovalent metal ion, for example sea water, but in an aqueous liquid containing polyvalent metal ion, for example in a cement slurry containing a large amount of polyvalent metal such as calcium ions, a crosslinking occurs due to the polyvalent metal, so that the absorbency deteriorates.

Moreover, in general, the polymer of ① above copolymerizes mainly with sulfonic acid monomer. However, this sulfonic acid monomer does not polymerize sufficiently, so that the molecular weight of the polymer is not easily increased, and the gel elasticity of the obtained polymer is not excellent. Moreover, the market price of such sulfonic acid monomer is high, and thus this type of polymer is uneconomical.

In ② above, PVA which is a copolymerization component is a hydrophilic nonionic compound. If the compolymerization ratio of PVA is increased, the absorbency is relatively increased in the presence of a great amount of a polyvalent metal salt such as calcium. However, the crosslinking copolymer of PVA-acrylic acid (salt) is generally produced by copolymerizing acrylate, vinyl acetate and hydrophobic crosslinking agent and then saponifying with alcoholic alkali. Therefore, the molecular weight of the crosslinking copolymer cannot easily be increased and the gel strength of the polymer in a solution of metal salt is weak as compared with a polymer produced by the general aqueous solution polymerization.

Moreover, during saponification, excess alkali or by-produced sodium acetate or methanol must be removed by washing, thus making the process complicated.

In ③ above, since acrylamide is a hydrophilic nonionic compound and the polymerization property of monomer is excellent, the absorbency of an aqueous salt solution containing a great amount of polyvalent metal salt and the gel strength are relatively good as compared with the materials described in the ① and ② above. However, polymerization is conducted in the presence of a crosslinking agent, so that a crosslinking structure is homogeneous. Therefore, if a crosslinking degree is low, the gel strength of the obtained polymer deteriorates. On the other hand, if a crosslinking degree is high, the absorbency of the obtained polymer deteriorates. Consequently, it is difficult to attain both sufficient absorbency and sufficient gel strength.

The present invention seeks to solve the above mentioned problems in the ①–③ above and is directed to a water-absorbent resin derived from monomer unit components comprising, at a predetermined ratio, hydroxyl group-containing water soluble mono-(meth)acrylate and (meth) acrylic acid (alkali metal salt). The above mentioned water-absorbent resin of the present invention has: high absorbency of aqueous liquids having a great amount of polyvalent metal, for example a cement slurry; high gel elasticity of a polymer; and excellent gel stability when exposed to the light. Moreover, in a case where a water-absorbent resin of the present invention has a structure having a resistance to alkaline hydrolysis, the gel stability is excellent even if exposed to high temperature under alkaline conditions; and a thermally crosslinked product of a copolymer comprising, at the predetermined ratio, (meth) acrylamide and (meth)acrylic acid (alkali metal salt) has an extremely low crosslinking degree at the inner part of a resin particle and a high crosslinking degree in the outer surface part of a resin particle, and so that the thermally crosslinking product has high absorbency of aqueous liquids containing a large amount of polyvalent metal such as a cement slurry or the like.

SUMMARY OF THE INVENTION

It is an object of the present invention to provide a water-absorbent or water-retention material which is not easily subjected to an influence of salts and has high absorbency even for a highly concentrated salt solution containing a high concentration of metal ion.

It is another object of the present invention to provide a water-absorbent or water-retention material having improved absorbency even for an aqueous liquid containing polyvalent metal ion.

Is is still another object of the present invention to provide a water-absorbent or water-retention material having excellent stability even when the hydrogel is stored under a condition in which radicals are generated, for example, if the hydrogel is irradiated with light or heated.

It is a further object of the present invention to provide a method for producing a water-absorbent or water-retention material.

The present invention provides a water-absorbent or water-retention material comprising a water-absorbent polymer (A) derived from monomer unit components comprising 40 to 99 wt. % of a hydroxyl group-containing water soluble mono-(meth)acrylate (a); 1 to 60 wt. % of at least one monomer selected from the group consisting of acrylic acid, methacrylic acid, acrylic acid alkali metal salt, and methacrylic acid alkali metal salt (b); 0.00001 to 3 wt. % of crosslinking agent (c); and optionally not more than 10 wt. % of another water soluble ethylenically unsaturated monomer (d). In addition, the present invention relates to a water-absorbent or water-retention material comprising the water-absorbent resin (A) having a hydrolysis resistant crosslinking structure.

Moreover, the present invention provides a water-absorbent or water-retention material comprising a thermally-crosslinked product of a copolymer (P) of 20 to 99 mol % of (meth)acrylamide (e), and 1 to 80 mol % of at least one kind of monomer selected from the group consisting of acrylic acid, methacrylic acid, acrylic acid alkali metal salt and methacrylic acid alkali metal salt (f), and optionally not more than 10 mol % of another water soluble ethylenically unsaturated monomer (g). Another aspect of the present invention is to provide a method for producing a water-absorbent or water-retention material. The method of the present invention involves heating at 130 to 230° C. to thermally crosslink a copolymer (P) of 20 to 99 mol % of (meth)acrylamide (e), 1 to 80 mol % of at least one kind of monomer selected from the group consisting of acrylic acid, methacrylic acid, acrylic acid alkali metal salt and methacrylic acid alkali metal salt (f), and optionally not more than 10 mol % of another water soluble ethylenically unsaturated monomer (g).

DETAILED DESCRIPTION OF THE INVENTION

First, a water-absorbent or water-retention material comprising the above mentioned water absorbent resin (A) will be explained as follows.

In the present invention, the hydroxyl group-containing water soluble mono-(meth)acrylate (a) is not particularly limited as long as it has a hydroxyl group in the molecule and is water soluble mono-(meth)acrylate. Examples of such water soluble mono-(meth)acrylates include hydroxyalkyl mono-(meth)acrylate containing 2 to 4 carbon atoms in the alkyl group, mono-(meth)acrylate of polyalkylene glycol (containing 2 and/or 3 carbon atoms in the alkylene group; polymerization degree: 2 to 20 or higher) such as mono-(meth)acrylate of polyethylene glycol (polymerization degree: 2 to 20), mono(meth)-acrylate of polypropylene glycol (polymerization degree: 2 to 10); as well as mono-(meth)alkyl ethers of the corresponding polyalkylene glycol, and the like.

A preferable example among the above is hydroxyalkyl (meth) acrylate containing 2 or 3 carbon atoms in the alkyl group and mono(meth)acrylates of polyethylene glycol (polymerization degree: 2 to 20). Specific examples of the preferable hydroxyalkyl (meth)acrylate include β-hydroxyethyl (meth)acrylate, β-hydroxypropyl (meth) acrylate, and γ-hydroxypropyl (meth)acrylate and mono (meth)acrylates of polyethylene glycol (polymerization degree: 2 to 20).

The copolymerization ratio of hydroxyl group-containing water soluble mono (meth)acrylate (a) is generally 40 to 99 wt. %, more preferably 60 to 95 wt. %. It is not preferable for the copolymerization ratio of hydroxyl group-containing water soluble mono-(meth)acrylate to be less than 40 wt. % since the absorbency of aqueous salt solution deteriorates. Also, it is not preferable for the copolymerization ratio of hydroxyl group-containing water soluble mono-(meth) acrylate to be more than 99 wt. % since the absorbing rate deteriorates.

In the present invention, examples of the (meth)acrylic acid (alkali metal salt)(b) used for the copolymerization include (meth)acrylic acid and (meth)acrylic acid alkali metal salts such as Na or K salts.

In general, the neutralization degree of the (b) unit in the water-absorbent resin (A) is 40 to 100 mol %, more preferably 60 to 100 mol %. It is preferable to make the neutralization degree 40 mol % or more since (meth)acrylic acid salts dissociate sufficiently and high absorbency and a high absorbing rate can be attained.

In general, the neutralization of (meth)acrylic acid can be conducted by adding alkali metal hydroxide (for example, sodium hydroxide, potassium hydroxide, lithium hydroxide or the like).

The neutralization of (meth)acrylic acid is conducted at the stage of monomer before polymerization, or by adding alkali metal salts into the hydrogel after polymerization. However, in a case where the below mentioned hydrolysis resistant allyl ether crosslinking agent that does not contain an amide group or an ester group is used as a crosslinking agent (c), the crosslinking agent has low hydrophilicity. Therefore, it is preferable to conduct polymerization before neutralization since the crosslinking agent can be homogeneously dissolved.

In the present invention, the copolymerization ratio of (meth)acrylic acid (alkali metal salt) (b) is usually 1 to 60 wt. %, more preferably 5 to 40 wt. %. If the ratio of (meth) acrylic acid (alkali metal salt) (b) is less than 1 wt. %, the absorbing rate of the water-absorbent or water-retention material decreases.

On the other hand, if the copolymerization ratio of (meth) acrylic acid (alkali metal salt) is more than 60 wt. %, the copolymerization ratio of hydroxyl group-containing water soluble mono-(meth)acrylate (a) is deteriorated, so that the absorbency for an aqueous solution of salt deteriorates.

In the present invention, when the hydroxyl group-containing water soluble mono-(meth)acrylate (a) and (meth)-acrylic acid (alkali metal salt) (b) are copolymerized, optionally 0 to 10 wt. % of another water soluble ethylenically unsaturated monomer (d) may be copolymerized therewith.

This further water soluble ethylenically unsaturated monomer is not particularly limited as long as it is a water soluble ethylenically unsaturated monomer that is copolymerizable with the hydroxyl group-containing water soluble mono-(meth)acrylate and (meth)acrylic acid (alkali metal salt). Examples of such water soluble ethylenically unsaturated monomers include acrylamide, sulfoalkyl (meth) acrylate or alkali metal salt thereof, 2-acryl amide-2-methyl propane sulfonic acid and alkali metal salt thereof, styrene sulfonic acid and alkali metal salt thereof, maleic acid, itaconic acid or the like. Moreover, two or more types of these water soluble ethylenically unsaturated units may be used in combination in a predetermined amount.

In the present invention, in order to obtain the water-absorbent resin (A) which has excellent salt resistance, the crosslinking agent (c) is used. Examples of the crosslinking agent (c) include a radical copolymerizable crosslinking agent having two or more double bonds in the molecule (c1) and a reactive crosslinking agent having two or more functional groups that react with a hydroxyl group and/or carboxyl group (c2).

In a case where (c1) is used, (c1) is added during polymerization and copolymerized in the presence of a hydroxyl group-containing water soluble mono-(meth) acrylate (a), (meth)-acrylic acid (alkali metal salt) (b) and optionally another water soluble ethylenically unsaturated monomer (d).

In a case where (c2) is used, (c2) is added during and/or after polymerization and if necessary, crosslinking is conducted while heating.

The polymerizable crosslinking agent (c1) is not particularly limited as long as it has two or more double bonds in the molecule and can be copolymerized with hydroxyl group-containing water soluble mono-(meth)acrylate (a), (meth)acrylic acid (alkali metal salt) (b) and another water soluble ethylenically unsaturated monomer (d) which is optionally added.

Specific examples of (c1) include N,N'-methylenebis acrylamide, ethylene glycol di-(meth)acrylate, trimethylolpropane di-or tri-(meth)acrylate, pentaerythritol di-(meth) acrylate, pentaerythritol tri-(meth)acrylate, pentaerythritol tetra-(meth)acrylate, glycerol diallylether, glycerol triallylether, trimethylol propane diallyl ether, trimethylol propane triallyl ether, pentaerythritol diallyl ether, pentaerythritol triallyl ether, pentaerythritol tetraallyl ether and triallyl oxyethane.

In addition, commercially available products of water soluble hydroxyl group-containing mono-(meth)acrylate (a) usually contain approximately 0.05 to 1.0 wt. % of di-(meth) acrylate monomer which is a crosslinking component. This is the same as that of the copolymerization of (c1) component, so that the crosslinking agent need not be added, depending on the content of di-(meth)acrylate component.

These radical polymerizable crosslinking agents (c1) may be used alone, or two or more types of crosslinking agents may be used at an amount within the predetermined range.

Examples of the reactive crosslinking agent (c2) having two or more functional groups which react with hydroxyl groups and/or carboxyl groups include a polyvalent glycidyl compound represented by ethylene glycol diglycidyl ether, a polyvalent isocyanate compound represented by diphenylmethane-2,4'-and/or 4,4'-diisocyanates (MDI), and a polyvalent amine compound represented by ethylene diamine. These reactive crosslinking agents may be used alone, or two or more types of crosslinking agents may be used in combination at the predetermined ratio. Moreover, these reactive agents may be used in combination with the polymerizable crosslinking agents (c1).

Among these polymerizable crosslinking agent (c1) and the reactive crosslinking agent (c2), preferred are crosslinking agents providing a hydrolysis resistant crosslinking structure for the purpose of improving gel stability and hydrolysis resistance under alkaline conditions or event at high temperature. Such crosslinking agents include, for example, crosslinking agents that have neither amide group nor ester group and produce neither an amide group nor ester group by a crosslinking reaction.

The specific examples include polyvalent allyl ethers such as glycerol diallyl ether, glycerol triallyl ether, trimethyrolpropane diallyl ether, trimethyrolpropane triallyl ether, pentaerythritol diallyl ether, pentaerythritol triallyl ether, pentaerythritol tetraallyl ether, and triallyl oxyethane.

The amount of crosslinking agent (c) varies depending on the absorbency, the gel elasticity of the required water-absorbent resin (A) and the kind of the crosslinking agent, but it is generally in the range of 0.00001 to 3 wt. %, more preferably in the range of 0.0001 to 1 wt. %. If the amount is less than 0.00001 wt. %, the gel elasticity is too low. On the other hand, if the amount is more than 3 wt. %, the crosslinking density increases too much and thereby the absorbency is deteriorated.

As mentioned above, commercially available monomer of hydroxyl group-containing water soluble mono-(meth) acrylate (a) generally contains 0.05–1.0 wt. % of di-(meth) acrylate monomers which are crosslinking components. However, if the content of di-(meth)acrylate monomers is too high, the crosslinking density is highly increased and thereby the absorbency deteriorates or the hydrolysis resistant crosslinking agent cannot be used.

Therefore, the content of di-(meth)acrylate monomers in (a) which is used in the present invention is generally not more than 0.5 wt. %, preferably not more than 0.2 wt. %, more preferably not more than 0.1 wt. %. It is not preferable to make the content of di-(meth)acrylate monomer more than 0.5 wt. % since the crosslinking degree of water-absorbent resin is too high and the absorbency deteriorates, although it varies depending on the intended uses. Furthermore, in di-(meth)acrylate monomer components, the ester part tends to be hydrolyzed and the crosslinking structure tends to be broken under alkaline conditions, for example in a cement composition, thus making the stability of the absorbent resin poor.

The method for decreasing the content of di-(meth) acrylate monomers in (a) can be any method to decrease the content of di-(meth)acrylate monomers in (a) to below the predetermined content. Examples of the above mentioned methods include the method of using a monomer that has been highly refined by distillation; and the method of decreasing the content of di-(meth)acrylate components in the monomer by adding water and organic solvent (hexane, toluene, fatty acid ester or the like) and extracting di-(meth) acrylate monomers to the side of the organic solvent layer.

For the method of copolymerizing in the presence of hydroxyl group-containing water soluble mono-(meth) acrylate (a), (meth)acrylic acid (alkali metal salt) (b), polymerizable crosslinking agent (c1), and optionally another water soluble ethylenically unsaturated monomer (d), a conventional well-known method can be used. Examples of such conventional copolymerization methods include polymerization adding a radical polymerizable initiator and the polymerization by irradiating with radioactive ray, ultraviolet ray or electron beams.

In the method of using the radical polymerization initiator, examples of such initiators include azo compounds such as azobiscyanovaleric acid, and 2,2'-azobis (2-amidino propane) hydrochloride; inorganic peroxides such as hydrogen peroxide, potassium persulfate, ammonium persulfate and sodium persulfate; organic peroxides such as di-t-butyl peroxide and cumene hydroperoxide; and redox initiators comprising the combination of a reducing agent such as alkali metal sulfite or alkali metal bisulfite, ammonium sulfite, ammonium bisulfite, L-ascorbic acid or the like, and a peroxide such as alkali metal persulfate, ammonium persulfate, hydrogen peroxide; and the combination of two or more of these.

The method of polymerizing in the presence of such initiator is not particularly limited. For example, the polymerization temperature may be varied depending on the types of initiators, but it is generally in the range of $-10°$ C. to $100°$ C. A more preferable temperature for increasing a molecular weight is in the range of $-10°$ C. to $80°$ C.

The amount of the initiator is not particularly limited, but it is preferable that the amount is in the range of 0.000001 to 3.0 wt. % with respect to the total weight of the monomer. More preferably it is in the range of 0.000001 to 0.5 wt. %.

As a solvent during polymerization, a solvent having less chain transfer such as water is generally used; thereby an aqueous solution polymerization is conducted. However, so called reverse phase suspension polymerization can preferably be used. In the reverse phase suspension polymerization, an aqueous solution of monomer is dispersed or suspended in the hydrophobic solvent (for example, hexane, toluene, xylene or the like) in the presence of a dispersing agent if necessary.

In the present invention, the water-absorbent resin (A) is obtained optionally by drying the hydrogel which is obtained by the polymerization. As the drying method, a conventional well known method can be adopted. In the case of polymer obtained by aqueous solution polymerization, the drying method includes air permeation drying or through air drying (band type drying or the like) or ventilation drying (air circulating drying or the like), and contacting drying (drum dryer drying or the like), which are conducted after the obtained hydrogel is pulverized. In a case of a polymer obtained by reverse phase suspension polymerization, the drying method includes depressurization drying or ventilation drying, which are conducted after a solid-liquid separation.

The drying of the hydrogel is generally conducted at not more than 150° C., more preferably at not more than 130° C. If the hydrogel is dried for a long time at 150° C., the crosslinking of hydroxyl group and carboxylic acid group proceeds excessively at the stage where water is dried out. Thus, the absorbency occasionally deteriorates.

In the present invention the dried polymer is optionally pulverized to obtain a predetermined particle size. As the pulverizing method, a conventional well known method may be adopted. Examples of a pulverizing method include using an impact pulverizer (such as a pin mill, cutter mill, pulpelyzer, centrifugal mill or the like), or an air pulverizer (such as a jet mill or the like).

The particle size of the pulverized product varies depending on the intended use, but for the purpose of the improvement of retaining the shape of the extrusion of a cement composition, the particle size is usually in the range of 1 to 1000 μm, more preferably in the range of 1 to 500 μm. On the other hand, in a case where the pulverized product is mixed into rubber as a sealing material for an aqueous solution containing cement solution for civil engineering, the particle size of the pulverized product is usually in the range of 0.1 to 100 μm, more preferably in the range of 0.5 to 50 μm.

In the present invention, for the purpose of increasing the water absorbing rate and preventing the size-controlled water-absorbent resin from forming lumps when water is absorbed, the size controlled water-absorbent resin, which is surface crosslinked by adding the above mentioned reactive crosslinking agents (c2) and heating optionally may be used as the absorbent resin (A).

The temperature of the surface crosslinking is generally not more than 150° C. It is preferable to make the crosslinking temperature not more than 150° C. since the extreme increase of the crosslinking degree due to a reaction between hydroxyl group and carboxylic acid group in the resin and the decrease of the absorbency can be inhibited.

The heating apparatus used for conducting the surface crosslinking may be any apparatus to heat particles homogeneously. Examples of such heating apparatus include a hot-air drier, a rotary drier, a paddle drier, a rotating disc drier, a fluidized bed drier, a belt type drier, a Nauta type heater, and an infrared drier.

The above mentioned water-absorbent resin (A) is the water-absorbent resin which is substantially water insoluble, excellent in stability, and salt resistant. The gel strength and the water absorbency of the above mentioned water-absorbent resins can be controlled depending on the intended use. However, the absorbency for a 10 wt. % concentrated aqueous solution of calcium chloride is generally not less than 10 times as much as the weight of the water-absorbent resin, and the elasticity of the water swollen gel which absorbs 10 wt. % concentrated aqueous solution of calcium chloride is not less than 50000 dyne/cm$^2$. More preferably, the absorbency is not less than 15 times as much as the water-absorbent resin, and the gel elasticity of the water swollen gel is not less than 80000 dyne/cm$^2$.

The water absorbent resin (A) of the present invention may be applied for absorbing or retaining various aqueous liquids. Examples of suitable aqueous liquids include water (including soft water and hard water); aqueous liquids of relatively low ion content, for example, body fluids (body exudates, such as urine, menstrual discharge and wound exudates): and aqueous liquids containing larger amounts of metal ion, for example, seawater and other saline waters.

The water-absorbent resins (A) of the present invention are particularly useful for absorbing or retaining aqueous dispersions containing polyvalent metal ions (ions of alkali earth metals such as calcium and magnesium, zinc, iron, tin, lead, copper and other transition or heavy metals), especially cement slurry having a high calcium ion content (for instance, 0.01% to 40% by weight or more).

In adding water-absorbent resin (A) to a cement slurry, the amount may vary widely according to purpose, applications and requirements therefor. The above mentioned resin (A) can be used usually in an amount of 0.01 to 10% by weight or more, preferably 0.05 to 5% by weight, based on the solid weight of cement contained in the slurry.

Therefore, in a case where the water-absorbent or water-retention material comprising the water absorbent resin (A) of the present invention is added into a cement slurry which is used for the extrusion molding, such as material for cement outer walls, even if a large pressure is applied during the extrusion molding, the gel is not broken and does not generate water. Thus, the viscosity of the molded cement slurry product can be increased or the shape of the molded product can be kept.

Moreover, in a case where the water-absorbent resin (A) has a hydrolysis resistant crosslinking structure, if it is exposed to alkaline conditions at high temperature, the gel does not so deteriorate. Consequently, the shape of the molded product can be maintained for a long time after extrusion.

In a case where the water absorbent resin (A) is used for producing a water swelling rubber by mixing a rubber substrate such as EPDM (ethylene-propylene-diene terpolymer), chloroprene rubber, SBR (stylene-butadiene rubber) or the like with water absorbent-resin (A), a sealing material comprising salt resistant water swelling rubber which has a high absorbing rate, and high absorbency can be produced because the water absorbent resin (A) can swell by overcoming the elasticity and by absorbing a salt solution. Moreover, since the gel is excellent in stability in the state in which water is contained, the re-contracting after swelling with water and deterioration of performance in preventing water-penetration can be inhibited.

The water-absorbent resin (A) may be added to a rubber or rubber-like base material in such an amount providing a sealing composition containing the above mentioned resin (A) in an amount of 1 to 50% by weight or more, preferably 5 to 40% by weight, based on the weight of the above mentioned base material.

Moreover, the water-absorbent or water retention material of the present invention can preferably be used in applications requiring a high swelling rate, high swelling pressure, durability in sea water, for example, water-sealing material for optical fiber to be used on the bottom of the sea.

Furthermore, stability under irradiation by light in the hydrogel state is extremely good. Therefore, the water-absorbent resin of the present invention can be used for water retainers for soil, or cold insulation material, which are exposed to the direct sunlight.

In the present invention, the water-absorbent or water-retention materials may be provided, at an arbitrary step of producing water-absorbent resin (A), with additives such as antiseptic agents, antimold agents, disinfectants, antioxidants, ultraviolet-absorbers, coloring agents, perfume agents, and deodorants.

Secondly, a water-absorbent or water-retention material comprising a thermally-crosslinked product of a copolymer (P) will be explained.

In the present invention, in order to obtain a copolymer (P), (meth)acryl amide (e) and (meth)acrylic acid (alkali metal salt) (f) are copolymerized at a predetermined ratio. Herein, "(meth)acrylic acid (alkali metal salt)" denotes, as mentioned above, at least one selected from the group consisting of acrylic acid, methacrylic acid or alkali metal salt thereof. In addition, "(meth)acryl—" denotes "acryl—" and/or "methacryl—". Therefore, "(meth)acrylamide" denotes "acrylamide" and/or "methacrylamide". The same shall apply hereinafter.

In general, the copolymerization ratio of (meth)acryl amide (e) and (mrth)acrylic acid (alkali metal salt) (f) is 20–99 mol % and to 80–1 mol %, more preferably the ratio is 60–95 mol % and 40–5 mol %.

It is not preferable that the ratio of (meth)acrylamide is less than 20 mol % since the absorbency for an aqueous salt solution deteriorates. On the other hand, it is not preferable that the ratio of (meth)acrylic acid (alkali metal salt) is less than 1 mol % since not only the absorbing rate deteriorates but also a following thermal crosslinking cannot proceed well.

In the present invention, the neutralization degree of (meth)acrylic acid (alkali metal salt) (f) unit in the copolymer (P) is preferably the same ratio as the neutralization degree of (b).

In the present invention, when (meth)acrylamide (e) and (meth)acrylic acid (alkali metal salt) (f) are copolymerized, optionally not more than 10 mol % of another water soluble ethylenically unsaturated monomer (g) may be copolymerized.

Specific examples of such water soluble ethylenically unsaturated monomer (g) are the same as the above mentioned water soluble ethylenically unsaturated monomer (d).

In the present invention, the copolymer (P) may optionally use a preliminarily crosslinked product by adding a crosslinking agent (h) in an amount of not more than 1 mol % with respect to the total amount of (e), (f) and (g).

Examples of such crosslinking agent (h) include a crosslinking agent containing two or more ethylenically unsaturated functional groups in the molecule and/or two or more reactive functional groups in the molecule, which are the same as the above mentioned crosslinking agent (c). Concrete examples of such crosslinking agent containing two or more ethylenically unsaturated functional groups include ethylene glycol diacrylate, trimethylolpropane tri- (or di-) acrylate, glycerol tri-(or di-) acrylate, ethylene glycerol diallyl ether, glycerol tri- (or di-) allyl ether, pentaerythritol tri- (or di-) allyl ether, and N,N'-methylenebis acrylamide.

Specific examples of the crosslinking agent containing two or more reactive functional groups include polyvalent glycidyl compounds such as ethylene glycol diglycidyl ether, glycerol tri- (or di-) glycidyl ether, polyglycerol polyglycidyl ether or the like; polyamine compounds such as ethylene diamine, diethylene triamine, triethylene tetramine or the like; polyisocyanate compounds such as 2,4-tolylene diisocianate, hexane methylene diisocyanate or the like.

The amount of crosslinking agent (h) which is optionally added is generally not more than 1 mol %, preferably not more than 0.1 mol %, more preferably not more than 0.05 mol % with respect to the total amount of (e), (f) and (g). If the amount is more than 1 mol %, even the inner part of the copolymer (P) is sufficiently crosslinked, so that the absorbency deteriorates. Consequently, the below mentioned thermally crosslinking becomes meaningless.

In a case where a crosslinking agent (h) contains two or more ethylenically unsaturated functional groups, the crosslinking agent (h) generally is added during the copolymerization of (e), (f) and (g) and copolymerized therewith. In a case where the crosslinking agent (h) contains two or more reactive functional groups, the crosslinking agent (h) can be added at an arbitrary stage during or after polymerization, and crosslinking can be conducted by heating, if necessary.

In the present invention, as a method for copolymerizing (meth)acrylamide (e), (meth)acrylic acid (alkali metal salt) (f) and optionally another water soluble ethylenically unsaturated monomer (g), a conventional method may be adopted. Specific copolymerization conditions, a polymerization initiator, a polymerization solvent etc. are the same as in the polymerization of water-absorbent resin (A).

The polymerization concentration, which is the monomer concentration during polymerization, is generally in the range of 10 to 60 wt. %, preferably in the range of 20 to 50 wt. %. If the polymerization concentration is not more than 10 wt. %, the molecular weight of the copolymer (P) tends to be difficult to increase and thus this tend to be inefficient. On the other hand, if the polymerization concentration is more than 60%, the temperature of polymerization tends to be difficult to control.

A hydrogel material of a copolymerization (P) can be obtained through the above mentioned polymerization. In producing the copolymer (P), in a case where a crosslinking agent (h) is not added, the copolymer (P) of the present invention becomes a non-crosslinked water soluble polymer.

It is preferable that the polymerization condition is selected in a way in which the intrinsic viscosity [η] (the indicator of molecular weight) of the non-crosslinked water soluble polymer is generally not less than 15, preferably not less than 20, more preferably in the range of 25 to 50. It is preferable for the intrinsic viscosity [η] of the non-crosslinked copolymer (P) to be not less than 15 since the following unfavorable problems do not occur: a molecular weight is unduly low, so that absorbency and the gel strength of a water-absorbent or water-retention material deteriorate even if the below mentioned thermally crosslinking is conducted afterward.

In a case where a crosslinking agent (h) is added, the copolymer (P) is a crosslinked product, so that the intrinsic viscosity [η] of the copolymer (P) cannot be measured. However, if only the crosslinking agent (h) is deleted, the copolymer (P) is preferably copolymerized under conditions in which the intrinsic viscosity [η] is not less than 15.

In the present invention, for the purpose of increasing the crosslinking density during the below mentioned thermal crosslinking, water soluble polyhydric alcohol optionally can be added at the time of polymerizing the copolymer (P) or at any stage of hydrogel between polymerization and drying.

Examples of such water soluble polyhydric alcohol which is optionally added include ethylene glycol, glycerol, pentaerythritol, diethylene glycol, triethylene glycol, polyglycerol or the like.

Polyhydric alcohol need not always be added. However if polyhydric alcohol is added, the additive amount is generally 0.01 to 10 wt. %, more preferably 0.1 to 8 wt. % with respect to the total amount of (e), (f) and (g).

In the present invention, in a case where a hydrogel of the copolymer (P) is obtained by the method of aqueous solution polymerization or reverse phase suspension polymerization, the hydrogel is optionally dried. As a method for drying and a method of pulverizing the copolymer (P), the above mentioned method can be adopted.

In a thermal crosslinking of the copolymer (P), the copolymer (P) may be thermally crosslinked by heating at the predetermined temperature before the particle size is adjusted to the intended particle size by pulverizing thereof depending on the intended uses. However, it is preferable that the copolymer (P) is thermally crosslinked by heating at the predetermined temperature after the copolymer (P) is adjusted to a powder or particle having the intended particle size.

The heating temperature is generally in the range of 130 to 230° C., preferably in the range of 150 to 210° C. It is preferable that the heating temperature falls within the above mentioned range since the following unfavorable problems do not occur: the heating temperature is too low, so that the thermal crosslinking does not proceed; or on the other hand, the heating temperature is too high, so that the poly(meth) acrylamide portion of the polymer is decomposed into ammonia or carbon dioxide, thus deteriorating the quality of the polymer.

Although the heating time varies depending on the intended crosslinking degree, it is generally in the range of 1 to 600 minutes, preferably in the range of 5 to 300 minutes after the particles of polymer reach the intended temperature. It is preferable for the heating time to fall within the above mentioned range since the following unfavorable problems do not occur: the heating time is too short, so that a thermal crosslinking cannot be sufficiently conducted; or the heating time is too long, so that the partial decomposition take place.

The particle size when a crosslinking is conducted in a particle state varies depending on the purpose of use. For example, in a case of being used as an additive agent for the purpose of improving the shape keeping property of the extrusion molded cement composition, the average particle size is generally in the range of 1 to 1000 μm, preferably in the range of 5 to 500 μm. On the other hand, in a case where particles of a crosslinking product are kneaded into rubber as a sealing material of an aqueous solution containing cement water for civil engineering, the particle size is generally in the range of 0.1 to 100 μm, more preferably in the range of 0.5 to 50 μm.

In a case where the copolymer (P) is thermally crosslinked by heating at the predetermined temperature after the copolymer (P) is adjusted to a powder or particle having the intended particle size, the water-absorbent or water-retention material is obtained which the crosslinking density of the inner part of a particle is low and the outer surface part of a particle is highly crosslinked.

A mechanism of thermal crosslinking is not clarified. However, judging from the analyzed results of an infrared absorption spectrum or a nuclear magnetic resonance spectrum, and judging from the fact that if the ratio of (meth)acrylic acid (alkali metal salt) (b) increases, a crosslinking degree is accordingly increases; anhydride between carboxylic acid groups and between carboxylic acid and amide group, or imide bonds between carboxylic acid group and amide group are presumed to be formed by a thermal crosslinking. Moreover, in a case where a polyhydric alcohol is optionally added into the polymer, also ester bonds are presumed to be partly formed between carboxylic acid group and alcohol.

The reason why a polymer having a low crosslinking density at the inner part of a particle and being highly crosslinked at the outer surface part of a particle can be obtained by heating is thought to be as follows. Any heating reactions which are thought to be generated are reactions which by-produce water or ammonia gas. Water or ammonia being by-produced at the outer surface part of a particle is removed from a particle by heating, so that a crosslinking reaction at the outer surface part of a particle is highly encouraged. However, presumably, at the inner part of a particle, a considerable amount of water or ammonia is trapped in a particle. Consequently, a crosslinking reaction which is an equilibrium reaction is not readily encouraged, thus making the crosslinking density low at the inner part of a particle.

As evidence supporting this, in a case where the same dry powder of non-crosslinked polymers having different particle sizes is thermally crosslinked under the same conditions. The rate of a crosslinking reaction of a particle having smaller particle size is high; and trapped ammonia and water are generated from the inner part of a particle when a particle of relatively large particle size is re-pulverized.

The water-absorbent or water-retention material comprising thermally crosslinked products of a copolymer (P) of the present invention obtained through the above mentioned procedure is excellent in the absorbency for an aqueous salt solution, the gel strength and the salt resistance as compared with a crosslinking polymer obtained by homogeneously crosslinking (but not thermally crosslinking) the same composition using a crosslinking agent, under the same polymerization conditions.

The reason for the above is presumed as follows: the thermally crosslinked water-absorbent resin of the present invention has high water-absorbency and high gel strength as compared with the crosslinked polymer which is homogeneously crosslinked since it is crosslinked in a way in which a crosslinking degree at the inner part of a particle is low and the outer surface part of a particle is highly crosslinked, in other word, it is crosslinked by so-called the principle of surface crosslinking.

The heating apparatus used for thermally crosslinking dried particles of the copolymer (P) may be any apparatus to heat particles homogeneously. Examples of such heating apparatus include a hot-air drier, a rotary drier, a paddle drier, a rotating disc drier, a fluidized bed drier, a belt type drier, a Nauta type heater, and an infrared drier.

The water-absorbent or water-retention material of the present invention is substantially water insoluble, and salt resistant. The absorbing and retaining amount can be controlled depending on the purpose of the uses. However, the absorbency of 10 wt. % concentrated aqueous solution of calcium chloride is generally not less than 10 times as much as the weight of the water-absorbent or water-retention material, and the elasticity of the gel swollen with water which absorbs 10 wt. % concentrated aqueous solution of calcium chloride is not less than 50000 dyne/cm$^2$. More preferably, the absorbency is not less than 15 times as much as the water-absorbent or water-retention material, and the gel elasticity of the gel swollen with the aqueous solution is not less than 80000 dyne/cm$^2$.

Therefore, in a case where the salt resistant water absorbent resin of the present invention is added into a cement slurry product which is used for the extrution molding, such as material for cement outer walls, if high pressure is applied during the extrusion molding, the gel is not broken and does not generate water. Thus, the viscosity of the molded cement product can be increased or the shape of the molded product can be kept.

In a case where the water-absorbent or water-retention material of the present invention is mixed into a rubber substrate such as EPDM (ethylene-propylene-diene terpolymer), chloroprene rubber, SBR (stylene-butadiene rubber) or the like, a sealing material comprising salt resistant water-swellable rubber which has a high absorbing rate, and high absorbency can be produced because it can swell by overcoming the pressure of rubber and by absorbing a salt solution.

Moreover, the water-absorbent or water retention material of the present invention can be used for applications requiring a high swelling rate, high swelling pressure and durability in sea water, for example, water-sealing material for optical fiber to be used on the bottom of the sea.

Additives such as antiseptic agents, antimold agents, disinfectants, antioxidants, ultraviolet-absorbers, coloring agents, perfume agents, and deodorants may be added at an arbitrary stage of the method for producing the water-absorbent or water-retention material of the present invention.

The present invention will be further illustrated with reference to Examples and Comparative Examples hereinafter. However, the present invention is not limited to the embodiments illustrated in the Examples and Comparative Examples herein.

The water-absorbent resin was evaluated in terms of the following points ①–⑤:

① absorbency for 10 wt. % aqueous solution of calcium chloride;

② absorbency for artificial sea water;

③ gel elasticity after absorbing 10 wt. % aqueous solution of calcium chloride and gel stability after heated; and ④ gel stability after irradiation with light.

⑤ intrinsic viscosity of non-crosslinked polymer [η]

Each value is measured by the following procedure. Hereinafter, % represents wt. % unless otherwise noted.

① Absorbency for 10% Aqueous Solution of Calcium Chloride (Q1):

2.0 g of water-absorbent resin powder and 500 g of 10 wt. % aqueous solution of calcium chloride (pH=10 to 11) were placed in a one-liter beaker and stirred at the rate of 500 rpm for one hour by the use of a stirrer.

After a stirrer piece of the stirrer was removed, the entire solution was placed in a 330-mesh JIS standard sieve (size of mesh hole: 50 μm, hole diameter: 20 cm). Excess 10% aqueous solution of calcium chloride was drained off for 30 minutes. Then excess aqueous solution of calcium chloride retained between the screen and water-absorbent resin was removed with tissue paper through the mesh of the sieve. Then, the total weight of the water swollen water-absorbent resin and the sieve was measured. The absorbency for 10% aqueous solution of calcium chloride (Q1) was calculated from the below-mentioned formula.

$$Q1 = [(\text{total weight of water swollen water-absorbent resin and sieve}) - (\text{weight of the sieve})]/2.0$$

Thus, the absorbency of 10% aqueous solution of calcium chloride (Q1) is the weight (unit: g) of 10% aqueous solution calcium chloride which was absorbed by 1 g of the water-absorbent resin powder.

② Absorbency for Artificial Sea Water (Q2):

2.0 g of water-absorbent resin powder and 500 g of artificial sea water ("Aquamarine", the product of YASHIMA YAKUHIN CO., LTD.) were placed in a one-liter beaker and stirred at the rate of 500 rpm for one hour by the use of a stirrer.

After the stirrer piece was removed, the entire solution was placed in a 330-mesh JIS standard sieve (size of mesh hole: 50 μm, hole diameter: 20 cm). Excess artificial sea water was drained off for 30 minutes.

Then excess artificial sea water retained between the sieve and water-absorbent resins was removed with tissue paper through the mesh hole of the sieve. Then, the total weight of the water-swollen water-absorbent resin and the sieve was measured. The absorbency for artificial sea water (Q2) was calculated from the below-mentioned formula.

$$Q2 = [(\text{total weight of water-swollen water-absorbent resin and sieve}) - (\text{weight of sieve})]/2.0$$

Thus, the absorbency for artificial sea water means that the weight (unit: g) of artificial sea water absorbed by 1 g of water-absorbent resin powder.

③ Gel Elasticity ($E_0$) and Stability of Heated Gel of 10% Aqueous Solution of Calcium Chloride:

When the absorbency of 10% aqueous solution of calcium chloride was measured, 0.2 g of hydrogel left on the sieve was taken out and placed on a polytetrafluoroethylene measurement board of a creep meter (the product of YAMADEN CO., LTD) equipped with plunger No. 1.

This plunger was advanced towards the measurement board at the rate of 0.5 mm/second, and the gel was pressed evenly on the measurement board until 10 g of load was applied to the plunger, and the distance ($H_0$)(cm) between the plunger and the measurement board under 10 g of load was measured.

The load on the plunger was set to be 50 g and the gel was further pressed until 50 g of load was applied to the plunger. The distance ($H_1$)(cm) when the shape of gel instantaneously changed was measured by the use of an attached automatic analyzer. The Hookean elasticity ($E_0$) was calculated from the below-mentioned formula; the value was the gel elasticity.

$$gel\ elasticity\ (E_0) = P_0 / H_1 / H_0\ (dyne/cm^2)$$

$$P_0(stress) = F \times 980 / S\ (dyne/cm^2)$$

$$F(load)(g) = 50$$

$$S(sectional\ area)(cm^2) = V/(H_0 - H_1)$$

$$V(volume\ of\ sample)(cm^3) = sample\ weight/relative\ density(1.15)\ (g/cm^3)$$

5 g of the hydrogel left on the sieve was placed in a 6×8 cm polyethylene bag having a fastener, heated at 90° C. for 10 hours and then cooled down to room temperature. 0.2 g of the heated hydrogel was taken out and the gel elasticity was measured through a procedure similar to that mentioned above, followed by calculation of the stability of the heated gel from the below mentioned formula.

Formula: stability of heated gel (%)=(gel elasticity after heating/gel elasticity before heating)×100

④ Gel Stability After Light Irradiation 1.0 g of water-absorbent resin and 49.0 g of deionized water were placed in a 100 ml beaker to produce a hydrogel whose mass 50 times greater than that of the starting resin.

0.2 g of this hydrogel was taken out and the gel elasticity before light irradiation was measured by the use of a creep meter under the following conditions. The value was the gel elasticity.

$$gel\ elasticity(E_0) = P_0 / H_1 / H_0\ (dyne/cm^2)$$

$$P_0(stress) = F \times 980 / S (dyne/cm^2)$$

$$F(load)(g) = 50$$

$$S(sectional\ area)(cm^2) = V/(H_0 - H_1)$$

$$V(volume\ of\ sample)(cm^3) = sample\ weight/relative\ density(1.0)(g/cm^3)$$

10 g of the hydrogel containing 50 times as much water was placed in a 6×8 cm polyethylene bag having a fastener, and irradiated with xenon light from a distance of 15 cm. The irradiation was conducted at the blackboard temperature of 40° C. for 10 hours by the use of high energy xenon weatherometer [SUGA SHIKENKI Ind.]. Herein, the blackboard temperature denotes a temperature of a blackboard which was held with samples under irradiation, and this temperature is used as the standard temperature of irradiation.

After irradiation, the hydrogel was cooled down to room temperature. Then, 0.2 g of the irradiated hydrogel was taken out and the gel elasticity was measured by the use of a creep meter through the procedure similar to mentioned above, followed by calculation of the gel stability when light was irradiated from the below mentioned formula.

Formula: gel stability at the time of light irradiation (%)=(gel elasticity after irradiation/gel elasticity before irradiation)×100

⑤ The intrinsic viscosity of non-crosslinked polymer [η]

0.20 g of a dried product of a non-crosslinked copolymer (P) (or the corresponding amount of hydrogel to 0.20 g of the net weight of copolymer (P)) and 199.80 g of 5 wt. % concentrated aqueous solution of sodium chloride were placed in a beaker and stirred at the rate of 300 rpm with a magnetic stirrer for 3 hours to dissolve the copolymer homogeneously. The sample containing 0.10% net part of a copolymer (P) was produced. This sample was diluted by 5 wt. % aqueous solution of sodium chloride to produce samples whose net amount of the copolymer (P) is respectively 0.05%, 0.03% and 0.01%.

A Cannon Fenske viscometer was inserted vertically in water in a thermostat whose temperature is adjusted to 30° C.±0.1, and 10 ml of each sample was placed therein respectively. The temperature of each sample was being adjusted for 30–40 minutes and the time for each sample solution to flow between the predetermined scales of this viscometer was measured. The same procedure was conducted with respect to a 5% aqueous solution of sodium chloride alone under the same conditions. The resultant flow time was taken to be the base line.

The reduced viscosity [$\eta_{sp}/C$] was calculated from the below mentioned formula.

$$\eta_{sp}/C = (t - t_0)/t_0 \times 1/C$$

t: a flow time of a sample solution $t_0$: a flow time of 5% aqueous solution of sodium chloride alone C: the concentration of a sample solution $\eta_{sp}$: specific viscosity The concentration C (%) of each sample solution is marked on a horizontal axis and the reduced viscosity of $\eta_{sp}/C$ is marked on a vertical axis of the cross-section paper and each measurement point is plotted. A line passing each measurement point is drawn. The value of a point on which the above mentioned line meets to the vertical axis (C=0) is made to be the intrinsic viscosity [η].

EXAMPLE 1

260 g of commercially available 2-hydroxyethylacrylate (the content of di-(meth)acrylate monomer is 0.15%, the product of OSAKA YUKI-KAGAKU Ind.), 40 g of acrylic acid, 44 g of 48% aqueous solution of sodium hydroxide, and 656 g of water were placed in a one-liter beaker and cooled down to 10° C.

This solution was placed in a polymerizing vessel which allows adiabatic polymerization. By introducing nitrogen gas thereto, the amount of dissolved oxygen in the solution was reduced to 0.1 ppm. Then 0.007 g of 35% aqueous solution of hydrogen peroxide, 0.0025 g of L-ascorbic acid, and 0.125 g of 4,4'-azobis (2-amidinopropane) dihydrochloride were added thereto.

After approximately 30 minutes, the initiation of polymerization was observed. After approximately 2 hours, the solution reached the peak temperature, 66° C. After 5 hour maturation at this temperature, the polymerization was completed. The obtained polymer was in a hydrogel state.

This obtained hydrogel was pulverized with a meat grinder. Then, the pulverized hydrogel was neutralized by adding and kneading in the presence of an aqueous solution of sodium hydroxide. The neutralized hydrogel was dried at 120° C. for one hour by the use of a band type drier (air permeating drier, the product by INOUE KINZOKU Ind.). The dried product was pulverized to obtain the absorbent resin (1) having a particle size of 50–500 μm. The analyzed results of the quality of this product are shown in Table 1.

EXAMPLE 2

260 g of commercially available 2-hydroxyethylacrylate [the content of di-(meth)acrylate monomer is 0.15%, the product of OSAKA YUKI-KAGAKU Ind.], 700 g of water and 50 g of toluene were placed in a one-liter separatory funnel. The water layer was separated by extracting di-(meth)acrylate monomer into the toluene layer, and then an aqueous solution of 2-hydroxyethyl acrylate was obtained by removing di-(meth)acrylate monomer.

960 g of this aqueous solution of 2-hydroxyethylacrylate, 40 g of acrylic acid, and 0.05 g of pentaerythritol triallyl ether [the product of DAISO Co. Ltd.] as a crosslinking agent were placed in a one-liter beaker and cooled down to 10° C.

This solution was placed in a polymerizing vessel that allows adiabatic polymerization. By introducing nitrogen gas thereto, the amount of dissolved oxygen in the solution was reduced to 0.1 ppm. Then, 0.007 g of 35% aqueous solution of hydrogen peroxide, 0.0025 g of L-ascorbic acid, and 0.125 g of 4,4'-azobis (2-amidinopropane) dihydrochloride were added thereto.

After approximately 30 minutes, the initiation of polymerization was observed. After approximately 2 hours, the solution reached the peak temperature, 66° C. After 5 hour maturation at this temperature, the polymerization was completed.

The obtained polymer was in a hydrogel state. This obtained hydrogel was pulverized with a meat grinder. Then, the pulverized hydrogel was neutralized by adding and kneading in the presence of 44 g of 48% aqueous solution of sodium hydroxide. The neutralized hydrogel was dried at 120° C. for one hour by the use of a band type drier (air permeation drier, the product of INOUE KINZOKU Ind.). The dried product was pulverized to obtain the absorbent resin (2) having the particle size of 50 to 500 μm. The analyzed results of the product quality are shown in Table 1.

EXAMPLE 3

243.6 g of commercially available 2-hydroxyethylacrylate [the content of di-(meth)acrylate monomer is 0.05%, the product of OSAKA YUKI-KAGAKU Ind.], 60.5 g of acrylic acid, 10.7 g of sulfoethyl acrylate, 0.03 g of glycerol diallyl ether (the product of DAISO Co. Ltd.) and 685 g of water were placed in a one-liter beaker and cooled down to 10° C.

This solution was placed in a polymerizing vessel which allows adiabatic polymerization. By introducing nitrogen gas thereto, the amount of dissolved oxygen in the solution was reduced to 0.1 ppm. Then 0.07 g of 35% aqueous solution of hydrogen peroxide, 0.025 g of L-ascorbic acid and 0.15 g of potassium persulfate were added thereto. The nitrogen purge was continued untill the viscosity of the monomer solution increased.

After approximately 60 minutes, the initiation of the polymerization was observed. After approximately 6 hours, the solution reached the peak temperature, 73° C. and the polymerization was completed. The obtained polymer was in a hydrogel state. This obtained hydrogel was pulverized with a meat grinder. Then the pulverized hydrogel was neutralized by adding and kneading in the presence of 66 g of 48% aqueous solution of sodium hydroxide. The neutralized hydrogel was dried at 130° C. for five minutes by the use of a drum drier. The dried product was pulverized to obtain the absorbent resin (3) having a particle size of 50 to 500 μm. The analyzed results of the quality of the product was shown in Table 1.

EXAMPLE 4

260 g of commercially available polyethylene glycol mono acrylate (polymerization degree: 7), 40 g of acrylic acid, 44 g of 48% aqueous solution of sodium hydroxide, 0.05 g of pentaerythritol triallyl ether [the product of DAISO Co., Ltd.] as a crosslinking agent, and 656 g of water were placed in a one-liter beaker and cooled down to 10° C.

This solution was placed in a polymerizing vessel which allows adiabatic polymerization. By introducing nitrogen gas thereto, the amount of dissolved oxygen in the solution was reduced to 0.1 ppm. Then 0.007 g of 35% aqueous solution of hydrogen peroxide, 0.0025 g of L-ascorbic acid, and 0.125 g of 4,4'-azobis (2-amidinopropane) dihydrochloride were added thereto.

After approximately 30 minutes, the initiation of polymerization was observed. After approximately 2 hours, the solution reached the peak temperature, 55° C. After 5 hour maturation at this temperature, the polymerization was completed. The obtained polymer was in a hydrogel state.

This obtained hydrogel was pulverized with a meat grinder. Then, the pulverized hydrogel was neutralized by adding and kneading in the presence of an aqueous solution of sodium hydroxide. The neutralized hydrogel was dried at 120° C. for one hour by the use of a band type drier (air permeating drier, the product by INOUE KINZOKU Ind.). The dried product was pulverized to obtain the absorbent resin (4) having a particle size of 50–500 μm. The analyzed results of the quality of this product are shown in Table 1.

COMPARATIVE EXAMPLE 1

The commercially available "SANWET IM-5000D" [acrylic acid/sodium acrylate type water-absorbent resin, the product of Sanyo Chemical Industries, Ltd.] was used as a comparative resin (1). The analyzed result of the quality of the product are shown in Table 1.

COMPARATIVE EXAMPLE 2

172.8 g (0.80 mol) of sodium salt of sulfoethyl acrylate, 3.6 g (0.05 mol) of acrylic acid, 14.1 g (0.15 mol) of sodium acrylate, 0.154 g (0.001 mol) of N,N'-methylenebisacrylamide and 260 g of water were placed in a 500 ml separable flask. The solution was stirred to dissolve these homogeneously. After the displacement by nitrogen, the solution was heated by means of the hot water bath at 40° C. 1.0 g of 10% aqueous solution of ammonium persulfate and 5 g of 1% aqueous solution of L-ascorbic acid were added thereto. Then, stirring was stopped and the contents were polymerized.

After the initiation of polymerization, the generation of heat was observed. After 40 minutes, the temperature was 68° C. After a temperature decrease of polymerization was observed, it was further heated for one hour by raising the temperature of a hot water bath to 90° C.

The obtained hydrogel of the water-absorbent resin was pulverized. Then, the pulverized hydrogel was heated by the use of an air circulating drier at the temperature of 150° C. for 5 hours, and the dried product was pulverized to obtain the comparative water-absorbent resin (2). The analyzed results of this product quality are shown in Table 1.

COMPARATIVE EXAMPLE 3

3 g of partially saponified poly(vinyl alcohol) as a dispersion stabilizer and 300 ml of water were placed in a one-liter separable flask. Then, 60 g of vinyl acetate, 40 g of methyl acrylate, 0.1 g of divinylbenzene as a crosslinking agent and 0.5 g of benzoyl peroxide as a polymerization initiator were added to the aqueous solution and dispersed by stirring.

By introducing nitrogen gas, the dissolved oxide was displaced. Then the solution was heated to 65° C. by means of a hot water bath, and the suspension polymerization was conducted for approximately six hours to obtain the crosslinked copolymer.

10 g of the obtained crosslinked copolymer was dispersed in 300 ml of methanol, and 70 ml of an aqueous solution of sodium hydroxide of 5M (molar concentration) was added and saponified for five hours at the temperature of 60° C.

After saponification, the saponified copolymer was washed with methanol and filtered repeatedly. Free sodium hydroxide and sodium acetate, which were by-products of saponification, were removed. By drying under reduced pressure, the comparative water-absorbent resin (3) was obtained. The analyzed results of the quality of the product are shown in Table 1.

COMPARATIVE EXAMPLE 4

31.0 g of 80% of aqueous solution of acrylic acid was placed in the cylinderical circular four-neck flask having stirrer, circulating type cooler, dropping funnel and glass nitrogen introducing tube, and cooled from the outside while 95.5 g of 13.0% aqueous solution of sodium hydroxide was dropped thereto to neutralize 90 mol % of acrylic acid.

Then, 293.9 g of 25 wt. % of aqueous solution of acrylamide and 0.02 g of N,N'-methylenebisacrylamide were added and the mixture stirred to dissolve them homogeneously.

0.1 g of ammonium persulfate and 0.025 g of sodium hydrogensulfite were added thereto and dissolved, followed by deaeration by introducing nitrogen for 30 minutes.

The above mixed solution was heated to 50° C. by a hot water bath and then heated to 90° C. through the heat of the mixed solution itself. Then polymerization was completed after storage at 90° C. for one hour. The polymer was cracked, dried and pulverized to obtain a comparative water-absorbent resin (4). The analyzed result of the quality of the product is shown in Table 1.

TABLE 1

|  | absorbency of artificial sea water (g/g) | absorbency (g/g) | aqueous solution of 10 wt. % calcium choloride gel elasticity (dyne/cm$^2$) | gel stability after heating(%) | gel stability after light irradiation |
|---|---|---|---|---|---|
| Example 1 | 28 | 22 | 60000 | 35 | 80 |
| Example 2 | 27 | 17 | 135000 | 95 | 85 |
| Example 3 | 24 | 16 | 108000 | 95 | 86 |
| Example 4 | 26 | 18 | 125000 | 92 | 80 |
| Comparative Example 1 | 8 | 1 | 8000 | 35 | 0 |
| Comparative Example 2 | 28 | 13 | 23000 | 11 | 0 |
| Comparative Example 3 | 21 | 10 | 26000 | 90 | 75 |
| Comparative Example 4 | 26 | 16 | 36000 | 21 (odor of ammomia is emitted) | 0 |

The following points are apparent from Table 1.

① The water-absorbent resins (1) to (4) obtained from Examples 1 to 4 are more excellent than the comparative water-absorbent resins (1) to (3) obtained from Comparative Examples 1 to 3 in terms of the absorbency of 10 wt. % of aqueous solution of calcium chloride and of artificial sea water and the gel elasticity of 10 wt. % aqueous solution of calcium chloride.

② The water-absorbent resins (2) to (4) obtained from Examples 2 to 4 are much more excellent than the comparative water-absorbent resins (1), (2), and (4) obtained from the Comparative Examples 1, 2, and 4 in terms of the gel stability after heating ed and the gel stability after light irradiation.

③ Unlike the comparative water-absorbent resin (4) obtained from the Comparative Example 4, the water-absorbent resins (1) to (4) obtained from Examples 1 to 4 do not emit an odor of ammonium even if stored at high temperature under the alkaline condition.

EXAMPLE 5

50 g of acrylic acid, 55 g of aqueous solution of sodium hydroxide, 495 g of water and 400 g of 50% aqueous solution of acrylamide were placed in a one-liter beaker and cooled down to 5° C.

This solution was placed in a polymerizing vessel which allows adiabatic polymerization. By introducing nitrogen gas thereto, the amount of dissolved oxygen in the solution was reduced to 0.1 ppm. Then 0.0007 g of 35% aqueous solution of hydrogen peroxide, 0.0025 g of L-ascorbic acid, and 0.125 g of 4,4'-azobis (4-cyanovaleric acid) were added thereto.

After approximately 30 minutes, the initiation of polymerization was observed. After approximately 5 hours, the solution reached the peak temperature, 72° C. After polymerization was completed, the polymer of a hydrogel was obtained.

This obtained gel was pulverized with a meat grinder. Then, the pulverized hydrogel was dried at 100° C. for one hour by the use of a band type drier (air permeating drier, the product of INOUE KINZOKU Ind.). The dried product was pulverized to obtain non-crosslinked dried powder having a particle size of 50–500 μm. The intrinsic viscosity [η] of the non-crosslinked dried of polymer was 27.2.

100 g of non-crosslinked dried powder of polymer was placed into a stainless bat to the thickness of 3 mm, and was thermally crosslinked by heating by the use of an air circulating drier at 180° C. for 60 minutes to obtain the water-absorbent or water-retention material (4) of the present invention. The analyzed results of the quality of this product are shown in Table 2.

EXAMPLE 6

The same procedure as in Example 4 was conducted except that 1.25 g of diethylene glycol was kneaded into 100 g of polymerized gel which was obtained through Example 4 and the water-absorbent or water-retention material (5) of the present invention was obtained.

EXAMPLE 7

The same procedure as in Example 4 was conducted except that 0.03 g of pentaerythritol triallyl ether was added at the time of polymerization of Example 4 and the water-absorbent or water-retention material (6) of the present invention was obtained.

EXAMPLE 8

46 g of 48% aqueous solution of sodium hydroxide, 127 g of water and 120 g of 50% aqueous solution of acrylamide were added into 40 g of acrylic acid and cooled down to 10° C. to prepare the monomer solution, and then 0.05 g of potassium persulfate was added therein.

600 g of toluene and 1.0 g of styrene sodium sulfonate/stylene copolymer [the product of Sanyo Chemical Industries, Ltd.] as a dispersion agent were placed in a separable flask having a reflux condenser and a dropping funnel. By introducing nitrogen gas into toluene, the dissolved oxide was displaced. Then, the solution was heated to 60° C. by means of a water bath to homogeneously dissolve the dispersion agent.

Then, the temperature of toluene in the separable flask was maintained at 60° C., while the small amount of nitrogen was introduced. The monomer solution was dropped through the dropping funnel for 2 hours, and thus the reverse phase suspension polymerization was conducted. After the completion of dropping a monomer, polymerization was completed by raising the temperature of toluene to 65° C.

After polymerization, toluene was displaced by the method of decantation. The spherical hydrogel which is a polymerized product was washed by toluene containing no dispersion agents two or three times. Then, the polymer was dried by a reduced-pressure dryer at 80° C. to obtain a spherical dried powder of a non-crosslinked polymer.

The particle size of the dried powder of non-crosslinked polymer was approximately 150 $\mu$m on average. The intrinsic viscosity [$\eta$] of the spherical dried powder of the non-crosslinked polymer was 23.5.

100 g of this dried powder of non-crosslinked polymer was placed in a small-sized paddle drier having an electric heater (the product by HOSOKAWA MICRON Corporation) and heated to 200° C. while stirring the dried powder. The temperature of the dried powder of polymer was checked with a pen-type temperature recorder. Approximately 10 minutes after, the temperature reached 190° C. The heating was continued at this temperature for 30 minutes and thermal crosslinking was conducted to obtain a water-absorbent or water-retention material (7) of the present invention.

EXAMPLE 9

50 g of acrylic acid, 55 g of 48% aqueous solution of sodium hydroxide, 495 g of water, 400 g of 50% aqueous solution of acrylamide and 10 g of 2-hydroxy ethyl methacrylate were placed in a one-liter beaker and cooled down to 5° C.

This solution was placed in a polymerizing vessel that allows adiabatic polymerization. By introducing nitrogen gas thereto, the amount of dissolved oxygen in the solution was reduced to 0.1 ppm. Then 0.0007 g of 35% aqueous solution of hydrogen peroxide, 0.00025 g of L-ascorbic acid, and 0.125 g of 4,4'-azobis (4-cyanovaleric acid) were added thereto.

After approximately 40 minutes, the initiation of polymerization was observed. After approximately 6 hours, the solution reached the peak temperature, 73° C. Polymerization was completed and a polymer in a hydrogel state was obtained. The obtained hydrogel was pulverized with a meat grinder. Then, the pulverized hydrogel was dried by the use of a band type drier [an air permeating drier, the product of INOUE KINZOKU IND.) at 100° C. for one hour. Then, the dried product was pulveried to obtain a dried powder of the non-closslinked polymer having the particle size of 50–500 $\mu$m. The intrinsic viscosity [$\eta$] of the dried powder of the non-crosslinked polymer was 25.2.

100 g of dried powder of the non-crosslinked polymer was placed into a stainless vat to the thickness of 3 mm, and was thermally crosslinked with heating by an air circulating drier at 180° C. for 60 minutes to obtain a water-absorbent or water-retention material (8).

COMPARATIVE EXAMPLE 5

The commercially available "SANWET IM-5000D" [acrylic acid/sodium acrylate type water-absorbent resin, the product of Sanyo Chemical Industries, Ltd.] was used as a comparative resin (5).

COMPARATIVE EXAMPLE 6

172.8 g (0.80 mol) of sodium salt of sulfoethyl acrylate, 3.6 g (0.05 mol) of acrylic acid, 14.1 g (0.15 mol) of sodium acrylate, 0.154 g (0.001 mol) of N,N'-methylenebisacrylamide and 260 g of water were placed in a 500 ml separable flask.

The solution was stirred to homogeneously dissolve thereof. After the displacement by nitrogen, the solution was heated by means of a hot water bath at 40° C. 1.0 g of 10% aqueous solution of ammonium persulfate and 5 g of 1% aqueous solution of L-ascorbic acid were added thereto. Then, stirring was stopped and the contents were polymerized.

After the initiation of polymerization, the generation of heat was observed. After 40 minutes, the temperature was increased to 68° C. After a temperature decrease was observed, it was further heated for one hour by raising the temperature of a hot water bath to 90° C.

The obtained hydrogel of the water-absorbent resin was pulverized. Then, the pulverized hydrogel was heated by the use of an air circulating drier at the temperature of 150° C. for 5 hours, and the dried product was pulverized to obtain a comparative water-absorbent or water-retention material (6).

Moreover, in Comparative Example 6, the intrinsic viscosity [$\eta$] was measured without using N,N'-methylenebis acrylamide which is a crosslinking agent. The measured value of [$\eta$] was 4.3.

COMPARATIVE EXAMPLE 7

3 g of partially saponified poly(vinyl alcohol) as a dispersion stabilizer and 300 ml of water were placed in a one-liter separable flask. Then, 60 g of vinyl acetate, 40 g of methyl acrylate, 0.1 g of divinylbenzene as a crosslinking agent and 0.5 g of benzoyl peroxide as a polymerization initiator were added to the aqueous solution and stirred to disperse.

By introducing nitrogen gas, the dissolved oxygen was displaced. Then the solution was heated to 65° C. by means of a hot water bath, and the suspension polymerization was conducted for approximately six hours to obtain the crosslinked copolymer.

10 g of the obtained crosslinked copolymer was dispersed in 300 ml of methanol, and 70 ml of aqueous solution of sodium hydroxide of 5M (molar concentration) was added and saponified for five hours at the temperature of 60° C.

After saponification, the saponified copolymer was washed with methanol and filtered repeatedly. Free sodium hydroxide and sodium acetate, which were a by-product of saponification, were removed. By drying under reduced pressure, the comparative water-absorbent or water-retention material (7) was obtained.

Moreover, in Comparative Example 7, a non-crosslinked saponified product was obtained through the same polymerization and saponification as the above without using divinyl benzene which is a crosslinking agent. The intrinsic viscosity [$\eta$] of the obtained non-crosslinked product was 5.2.

COMPARATIVE EXAMPLE 8

In the polymerization of Example 4, 0.03 g of pentaerithritol triallyl ether as a crosslinking agent was added and was not thermally crosslinked to obtain a comparative water-absorbent or water retention material (8).

COMPARATIVE EXAMPLE 9

In the polymerization of Example 4, 1.0 g of N,N'-methylene bisacrylamide was used as a crosslinking agent and the product was not thremally crosslinked to obtain the comparative water-absorbent or water-retention material (9).

TABLE 2

| | intrinsic viscosity of non-crosslinked polymer [$\eta$] | absorbency of artificial sea water | aqueous solution of 10 wt. % calcium choloride | |
| --- | --- | --- | --- | --- |
| | | | absorbency (g/g) | gel elasticity (dyne/cm$^2$) |
| Example 5 | 27.2 | 35 | 25 | 96000 |
| Example 6 | 25.4 | 27 | 17 | 138000 |
| Example 7 | (27.2) | 33 | 23 | 106000 |
| Example 8 | 23.5 | 28 | 20 | 72000 |
| Example 9 | 25.2 | 30 | 22 | 86000 |
| Comparative Example 5 | — | 8 | 1 | 8000 |
| Comparative Example 6 | 4.3 | 28 | 8 | 23000 |
| Comparative Example 7 | 5.2 | 23 | 13 | 26000 |
| Comparative Example 8 | (27.2) | 37 | 27 | 16000 |
| Comparative Example 9 | (27.2) | 18 | 8 | 106000 |

The value written in ( ) is the value of the intrinsic viscosity [$\eta$] in case of being polymerized without using a crosslinking agent.

The following points are apparent from Table 2.

① The water-absorbent or water-retention materials (5) to (9) obtained from Examples 5 to 9 are more excellent than the comparative water-absorbent or water-retention materials (6) to (8) obtained from Comparative Examples 6 to 8 in terms of the absorbency for 10 wt. % concentrated aqueous solution of calcium chloride and for artificial sea water and the gel elasticity when absorbing 10 wt. % concentrated aqueous solution of calcium chloride.

② The water-absorbent or water-retention materials (5) to (9) obtained from Examples 5 to 9 are much more excellent than the comparative water-absorbent or water-retention material (8) obtained from the Comparative Examples 8 in terms of the gel elasticity of 10% aqueous solution of sodium chloride. When compared with the comparative water-absorbent or water-retention material (9) obtained from the Comparative Example 9, the water-absorbent or water-retention materials (5) to (9) are excellent in the absorbency of 10% an aqueous solution of calcium chloride.

The effect of the water-absorbent or water-retention material comprising the above mentioned water absorbent resin (A) will be explained as follows.

① The water-absorbent resin (A) is not readily subject to an influence of salts and the absorbency does not deteriorate even if the ion concentration of the salt solution is increased, because it is mainly comprised of a hydroxyl group-containing water soluble mono-(meth)acrylate which is a hydrophilic nonionic compound.

② The water-absorbent or water-retention material of the present invention contains a great amount of hydroxyl groups in the water absorbent resin. The hydroxyl groups trap radicals even if stored in a condition in which radicals are generated, for example, if the gel is exposed to light or heated. Consequently, the gel hardly deteriorates and is excellent in stability.

③ In a case where the water-absorbent or water-retention material of the present invention has the alkali hydrolysis crosslinking structure as its main structure, if it is stored in a hydrogel state at a high temperature under alkaline conditions, the gel does not deteriorate and is excellent in stability.

④ The present invention can provide an inexpensive salt resistant water-absorbent resin since it is mainly comprised of a monomer whose market price is not unduly high and whose manufacturing process is simple.

⑤ The water-absorbent or water-retention material of the present invention has an excellent absorbency for aqueous solutions having a high calcium ion content, for example, cement slurry or the like. Consequently if the water-absorbent or water-retention material is added in cement slurry, the property of keeping shape of a molded product of cement slurry is improved because of the viscosity increase of the cement slurry. Moreover, the gel elasticity is high, so that even if high pressure is applied to a cement slurry by an extruder or the like, the hydrogel does not release the water component, thus exhibiting an excellent water-retention property. In addition, even if the hydrogel is left under alkaline conditions at high temperature at maturing a cement or the like: the gel in the cement slurry hardly deteriorates and the shape is not easily lost during maturation.

Moreover, in a case where the cement slurry molded product is a dried hardened product, the portion where water-absorbent resin is present becomes closed cells (foam), so that the water-absorbent and water-retention material of the present invention can reduce weight while maintaining the strength of the cement product.

⑥ In a case where the water-absorbent or water-retention material of the present invention is kneaded into rubber or the like to produce a water swellable rubber, it has high absorbency for highly concentrated solution of salt. Consequently, the water-absorbent or water-retention material can absorb sea water or water bled out from molded cement material. Since the gel elasticity after swelling water is high, the gel quickly swells by overcoming the elasticity of the rubber and can quickly achieve sealing of sea water and bled water. Moreover, since the water-absorbent or water-retention material of the present invention has excellent compatibility with rubber, the water-absorbent resin dose not easily fall out of the water swellable rubber. In addition, the gel is very stable even in the state of containing water, so that once the water swellable rubber swells, it does not easily re-contract due to deterioration of the gel, thus exhibiting good water-sealing performance for long time.

⑦ Since the hydrogel of the water-absorbent or water-retention material of the present invention is excellent in stability to light, if it is used as a water-retainer for soil or as cold insulation which is subject to irradiation by sunlight, the hydrogel shows excellent stability for a long time.

In addition, the method for producing a water-absorbent and water-retention material comprising thermally-crosslinked products of copolymer (P) will be explained as follows.

① The water-absorbent or water-retention material of the present invention is mainly comprised of polyacrylamide, which is a hydrophilic nonionic compound, so that it is not readily subject to an influence of polyvalent metal ion and the absorbency for an aqueous liquid containing a large amount of polyvalent metal ions hardly deteriorates.

② The water-absorbent or water-retention material of the present invention uses acrylamide having excellent polymerization properties as a monomer, so that the molecular weight is easy to increase and absorbency for an aqueous liquid containing a large amount of polyvalent metal ion and gel elasticity are excellent.

③ The water-absorbent or water-retention material of the present invention comprises a water absorbent resin, in which a crosslinking degree is low at the inner part of the particle and the outer surface part of the particle is highly crosslinked. Consequently, the water-absorbent or water-retention material of the present invention is excellent in absorbency for a highly concentrated aqueous salt solution and gel elasticity as compared with a water absorbent resin that is homogeneously crosslinked.

④ The present invention can provide an inexpensive salt resistant water-absorbent or water-retention material since it is mainly comprised of a monomer whose market price is not unduly high and whose manufacturing process is simple.

Moreover, a water-absorbent or water-retention material comprising a thermally crosslinked product of the copolymer (P) of the present invention produced by the method of the present invention has the following properties.

① The water-absorbent or water-retention material of the present invention has an excellent absorbency for an aqueous solutions having a high calcium ion content, for example, cement slurry or the like. Consequently if the water-absorbent or water-retention material is added in cement slurry, the property of keeping shape of a molded product of cement slurry is improved because of the viscosity increase of the cement slurry.

Moreover, the gel elasticity is high, so that even if high pressure is applied to a cement slurry by an extruder or the like, the hydrogel does not release the water component, thus exhibiting an excellent water-retention property.

Moreover, in a case where the cement slurry molded product is dried to produce hardened product, the portion where water-absorbent resin is present becomes closed cells (foam), so that the water-absorbent and water-retention material of the present invention can have reduced weight while maintaining the strength of the cement product.

② In a case where the water-absorbent or water-retention material of the present invention is kneaded into rubber or the like to produce a water swellable rubber, it has high absorbency for highly concentrated solution of salt. Consequently, the water-absorbent or water-retention material can absorb sea water or water bled out from molded cement material. Since the gel elasticity after swelling is high, the gel quickly swells by overcoming the elasticity of the rubber and can quickly achieve sealing in sea water and bled water. Moreover, since the water-absorbent or water-retention material of the present invention has excellent compatibility with rubber, the water-absorbent resin does not easily fall out of the water swellable rubber.

As mentioned above, the water-absorbent or water-retention material of the present invention has various uses, for example admixture in the cement slurry, a water-retainer for plant or soil, a coagulant for hedoro (muddy sediment), a water-sealing material or packing material for construction, a water-sealing material for electric cable or optical fiber cable, and cold insulation.

Finally, it is understood that the invention may be embodied in other specific forms without departing from the spirit or essential characteristics thereof. The embodiments disclosed in this application are to be considered in all respects as illustrative and not restrictive, so that the scope of the invention is indicated by the appended claims rather than by the foregoing description, and all changes which come within the meaning and range of equivalency of the claims are intended to be embraced therein.

What is claimed is:

1. A water-absorbent or water-retention material comprising a water-absorbent resin (A) obtained by an aqueous solution polymerization or by a reverse phase suspension polymerization and derived from monomer unit components comprising 40 to 99 wt. % of hydroxyl group-containing water soluble mono-(meth)acrylate (a); 1 to 60 wt. % of at least one monomer selected from the group consisting of acrylic acid, methacrylic acid, alkali metal acrylate, and alkali metal methacrylate (b); and 0.00001 to 3 wt. % of crosslinking agent (c); wherein at least a part of the (b) unit is neutralized.

2. A water-absorbent or water-retention material according to claim 1, wherein the monomer unit components further comprise another water soluble ethylenically unsaturated monomer in an amount of not more than 10% by weight.

3. The water-absorbent or water-retention material according to claim 1, wherein said water-absorbent resin (A) is a water-absorbent resin derived from monomer unit components comprising 60 to 95 wt. % of hydroxyl group-containing water soluble mono-(meth)acrylate (a); 5 to 40 wt. % of at least one monomer selected from the group consisting of acrylic acid, methacrylic acid, alkali metal acrylate, and alkali metal methacrylate (b); 0.0001 to 1 wt. % of crosslinking agent (c); and optionally not more than 10 wt. % of another water soluble ethylenically unsaturated monomer (d).

4. The water-absorbent or water-retention material according to claim 1, wherein said hydroxyl group-containing water soluble mono-(meth)acrylate (a) is hydroxy alkyl (meth)acrylate having 2–3 carbon atoms in the alkyl group.

5. The water-absorbent or water-retention material according to claim 1, wherein the neutralization degree of the monomer (b) unit in said water-absorbent resin (A) is in the range from 60 to 100%.

6. A water-absorbent or water-retention material comprising a water-absorbent resin (A) derived from monomer unit components comprising 40 to 99 wt. % of hydroxyl group-containing water soluble mono-(meth)acrylate (a); 1 to 60 wt. % of at least one monomer selected from the group consisting of acrylic acid, methacrylic acid, alkali metal acrylate, and alkali metal methacrylate (b); and 0.00001 to 3 wt. % of crosslinking agent (c); wherein said water-absorbent resin (A) has a hydrolysis resistant crosslinking structure.

7. A water-absorbent or water-retention material according to claim 6, wherein the monomer unit components further comprise another water soluble ethylenically unsaturated monomer in an amount of not more than 10% by weight.

8. The water-absorbent or water-retention material according to claim 6, wherein said crosslinking agent is a polyallyl ether compound.

9. The water-absorbent or water-retention material according to claim 1, wherein the absorbency of the water-absorbent resin (A) for 10 wt. % concentrated aqueous solution of calcium chloride is not less than 10 g/g and the gel elasticity of the water-absorbent resin (A) is not less than 50000 dyne/cm$^2$.

10. A water-absorbent or water-retention material comprising a water-absorbent resin (A) derived from monomer unit components comprising 40 to 99 wt. % of hydroxyl group-containing water soluble mono-(meth)acrylate (a); 1 to 60 wt. % of at least one monomer selected from the group consisting of acrylic acid, methacrylic acid, alkali metal acrylate, and alkali metal methacrylate (b); and 0.00001 to 3 wt. % of crosslinking agent (c); wherein the surface of the water-absorbent resin (A) is crosslinked.

11. A water-absorbent or water-retention material according to claim 10, wherein the monomer unit components further comprise another water soluble ethylenically unsaturated monomer in an amount of not more than 10% by weight.

12. A composition which comprises an aqueous liquid of polyvalent metal, and a water-absorbent or water-retention material comprising a water-absorbent resin (A) derived from monomer unit components comprising 40 to 99 wt. % of hydroxyl group-containing water soluble mono-(meth) acrylate (a); 1 to 60 wt. % of at least one monomer selected from the group consisting of acrylic acid, methacrylic acid, alkali metal acrylate, and alkali metal methacrylate (b); and 0.00001 to 3 wt. % of crosslinking agent (c).

13. A water-absorbent or water-retention material according to claim 12, wherein the monomer unit components further comprise another water soluble ethylenically unsaturated monomer in an amount of not more than 10% by weight.

14. A composition according to claim 12, wherein said aqueous liquid is a cement slurry.

15. An extrusion molded article comprising a water-absorbent resin and a cement, wherein said article is produced by extrusion molding of a composition of claim 12.

16. A composition which comprises rubber or rubber-like base material, and a water-absorbent or water-retention material comprising a water-absorbent resin (A) derived from monomer unit components comprising 40 to 99 wt. % of hydroxyl group-containing water soluble mono-(meth) acrylate (a); 1 to 60 wt. % of at least one monomer selected from the group consisting of acrylic acid, methacrylic acid, alkali metal acrylate, and alkali metal methacrylate (b); and 0.00001 to 3 wt. % of crosslinking agent (c).

17. A water-absorbent or water-retention material according to claim 16, wherein the monomer unit components further comprise another water soluble ethylenically unsaturated monomer in an amount of not more than 10% by weight.

18. A method of retaining water, comprising adding to soil a water-absorbent or water-retention material comprising a water-absorbent resin (A) derived from monomer unit components comprising 40 to 99 wt. % of hydroxyl group-containing water soluble mono-(meth)acrylate (a); 1 to 60 wt. % of at least one monomer selected from the group consisting of acrylic acid, methacrylic acid, alkali metal acrylate, and alkali metal methacrylate (b); 0.00001 to 3 wt. % of crosslinking agent (c).

19. A water-absorbent or water-retention material according to claim 18, wherein the monomer unit components further comprise another water soluble ethylenically unsaturated monomer in an amount of not more than 10% by weight.

* * * * *